(12) United States Patent
Mitchell

(10) Patent No.: US 7,595,875 B1
(45) Date of Patent: Sep. 29, 2009

(54) ALIGNMENT SYSTEMS FOR SPECTROMETERS

(75) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 391 days.

(21) Appl. No.: 11/557,611

(22) Filed: Nov. 8, 2006

Related U.S. Application Data

(60) Provisional application No. 60/735,603, filed on Nov. 9, 2005.

(51) Int. Cl.
*G01J 3/18* (2006.01)
*G01J 3/28* (2006.01)

(52) U.S. Cl. ...................................................... 356/328
(58) Field of Classification Search ................. 356/326, 356/328
See application file for complete search history.

(56) References Cited

U.S. PATENT DOCUMENTS

| | | | |
|---|---|---|---|
| 4,480,914 A | 11/1984 | Thompson et al. | |
| 5,239,361 A | 8/1993 | Burch | |
| 5,657,122 A | 8/1997 | Curbelo et al. | |
| 5,717,487 A * | 2/1998 | Davies | 356/328 |
| 5,883,712 A | 3/1999 | Coffin | |
| 6,940,209 B2 | 9/2005 | Henderson | |
| 7,061,611 B2 | 6/2006 | Mitchell | |
| 7,199,876 B2 * | 4/2007 | Mitchell | 356/328 |

OTHER PUBLICATIONS

Mitchell, Thomas W. U.S. Appl. No. 60/735,603 entitled "Cryogenic Alignment System," filed Nov. 9, 2005.
Henderson, D. et al., "Inchworm® Motor Developments for the Next Generation Space Telescope (NGST)," SPIE vol. 3429, p. 252-256, Oct. 1998.
New Scale Technologies, "Linear Actuator", EO Magazine, p. 36, Mar. 2004.
New Scale Technologies, Cryogenic SquiggleTM Motor Operates at 100°K (copy not provided).

* cited by examiner

*Primary Examiner*—F. L Evans
(74) *Attorney, Agent, or Firm*—Burns & Levinson LLP; Jacob N. Erlich; Orlando Lopez

(57) ABSTRACT

A spectrometer having a housing, where the housing also includes a structure located within the housing, the structure being adapted to hold a reflective dispersive element and being movable in a direction substantially perpendicular to an interior longitudinal axis. An actuator arm extends from a location exterior to the housing to another location inside the housing. The actuator arm is disposed through an opening in the housing and is operatively connected to the structure. A cryogenic actuator motor is operatively connected to the actuator arm, thereby enabling movement of the structure and the reflective dispersive element in a direction substantially perpendicular to said interior longitudinal axis, whereby alignment of the spectrometer is enabled.

1 Claim, 9 Drawing Sheets

ALIGNMENT SYSTEMS FOR SPECTROMETERS

CROSS REFERENCE TO RELATED APPLICATIONS

This application claims priority of U.S. Provisional Application 60/735,603 entitled "CRYOGENIC ALIGNMENT SYSTEM," filed on Nov. 9, 2005, which is incorporated by reference herein.

BACKGROUND

Recent advances in spectrometer designs, such as those described in U.S. Utility patent application Ser. No. 10/749, 363, particularly in the long wavelength infrared (LWIR) spectrum, have resulted in unprecedented levels of compactness (see FIG. 1). As a result, it has become increasingly more feasible to incorporate the spectrometer itself into the Dewar assembly, thereby providing several advantages to the optical system. These advantages include, but are not limited to, a higher cold stop efficiency (virtually 100%) due to the optical stop being physically located within the cryogenic Dewar environment, a reduction in stray light resulting from the significantly smaller, slit proximate Dewar entrance window, and a significant reduction in background radiation from the cold optics of the spectrometer.

Because spectrometers are inherently rotationally asymmetric, they require several additional forms of alignment over conventional symmetric optical systems in order to operate properly. These typically include the rotational alignment of the sit aperture, dispersing element, and detecting element relative to one another, as well as the standard focus adjustment. Other alignments, such as the horizontal and vertical translational alignment of the slit aperture with respect to the detector element may also be necessary to meet system performance objectives. For optical systems that are located within a Dewar environment, this task typically requires first cooling the system down in order to take data measurements, then warming the system back up in order to make alignment adjustments. Because of the expansion and contraction of materials over such large temperature changes, a precise adjustment cannot be made reliably, and this process must typically be performed over several iterations, taking a great deal of time.

A rotational misalignment between the slit aperture, dispersing element, and detector element in a spectrometer can result in numerous spectral and spatial inaccuracies, and a significantly high degree of rotational alignment is typically required in order to provide accurate spectral signature information to data processing algorithms. This requirement is often on the order of one-tenth or one-twentieth of a pixel maximum displacement of a line image at the edge of the detector, which for a 512 pixel width detector array corresponds to approximately 0.2 milliradians of rotation. It is desirable to provide an angular resolution of at least half this value, or 0.1 milliradians, and for a spectrometer housing with a diameter of 20 millimeters that is driven by the translational motion of an actuator located at the circumference of the housing, the resulting required translational resolution of the actuator is approximately 1 micron.

Since a spectrometer is an imaging device, it is typically necessary to provide a method of focus alignment such that the line image presented at the slit aperture is properly focused at the detecting element. This requirement depends very strongly on the optical speed of the system, and can be determined by the axial translation necessary to generate a given change in spot size at the detector. This change is often on the order of 10 percent, which for a diffraction-limited F1.5 spectrometer system corresponds to approximately 10 microns of translation.

There are also a variety of other optical and sensor applications that require precise alignment. There is also a need for miniaturized and sensor optical applications.

BRIEF SUMMARY

In one embodiment, the system of these teachings includes a spectrometer comprising at least one slit element located at an object plane, a first optical sub-system having at least one refractive optical element, the first optical sub-system being capable of substantially collimating, at a center plane, electromagnetic radiation emanating from the at least one slit element, at least one dispersive element located substantially at the center plane, a second optical sub-system having at least one refractive optical element, the center plane being the plane of symmetry, the second optical sub-system being capable of imaging the substantially collimated electromagnetic radiation from the center plane onto an image plane, at least one detecting element located substantially at the image plane, wherein the at least one dispersive element comprises a reflective dispersive element, and, in the first optical sub-system is also the second optical sub-system, acting as a dual pass optical sub-system, a housing, where at least one optical component from the first optical sub-system is positioned within said housing, the housing defining an interior longitudinal axis, and where an optical axis of the first optical sub-system is substantially coincident with the interior longitudinal axis. The housing also includes a structure located within the housing, the structure being adapted to hold the reflective dispersive element and being movable in a direction substantially perpendicular to the interior longitudinal axis. An actuator arm extends from a location exterior to the housing to another location inside the housing. The actuator arm is disposed through an opening in the housing and is operatively connected to the structure. A cryogenic actuator motor is operatively connected to the actuator arm, thereby enabling movement of the structure and said reflective dispersive element in a direction substantially perpendicular to said interior longitudinal axis, whereby alignment of the spectrometer is enabled.

Other embodiments are also disclosed.

For a better understanding of the present invention, together with other and further needs thereof, reference is made to the accompanying drawings and detailed description and its scope will be pointed out in the appended claims.

DETAILED DESCRIPTION

Figure 1:
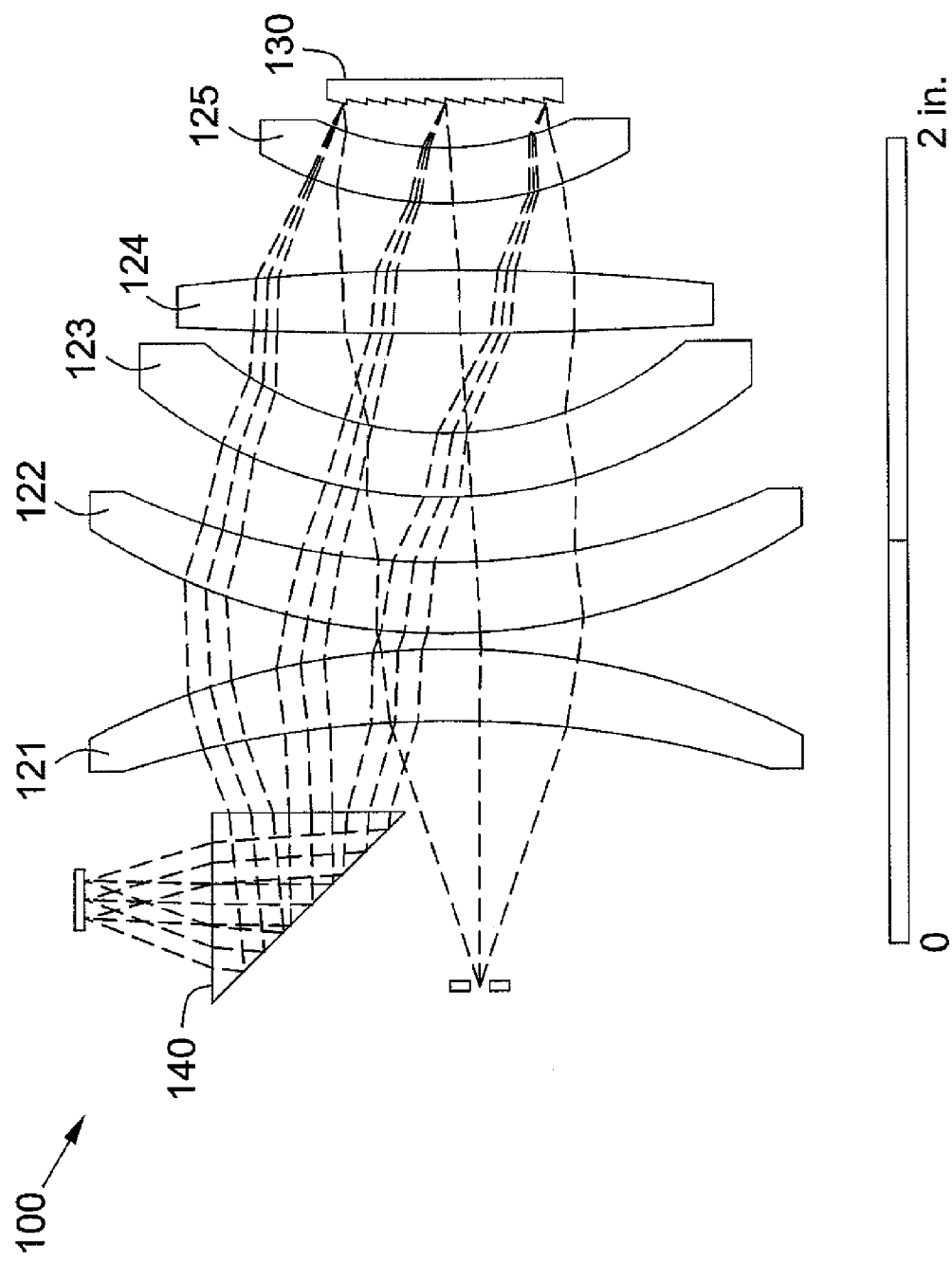
FIG. 1. Spectral View of Compact LWIR Spectrometer.

Recent advances in the development of high resolution, compact, and lightweight actuators for use in cryogenic environments, such as piezoelectric Inchworm® (D. A. Henderson and J. C. Fasick, "Inchworm® Motor Developments for the Next Generation Space Telescope (ANGST)," SPIE Vol. 3429, p. 252-256, October 1998, which is incorporated by reference herein).and Squiggle™ motors (New Scale Technologies, "Linear Actuator", EO Magazine, p. 36, March 2004, and New Scale Technologies, "Cryogenic Squiggle™ Motor Operates at 100° K," New Product Press Release, published on New Scale Technologies' website at http://www.newscaletech.com/PR%20Cryo%20SQ.pdf, Sep. 14, 2004, both of which are incorporated by reference herein) can be used for the dynamic alignment of optical components while operating within a cryogenic Dewar environment. There are a number of significant advantages that arise from the technical innovations described here, including:

The ability of miniature actuators to operate at cryogenic temperatures allows a spectrometer system that is located within a Dewar environment to be dynamically aligned while collecting data measurements, thereby eliminating the need for time consuming cool-down and warm-up iterations and enabling an extremely fast, easy, and even automated alignment procedure to be implemented with an increased degree of accuracy.

The extremely small and lightweight properties of the cryogenic actuators contribute very little to the overall size and weight of the spectrometer, allowing for these alignment devices to be integrated into the opto-mechanical hosing of the spectrometer and to remain a permanent part of the spectrometer device.

In some cases, these cryogenic actuators remain locked in position once their drive power is removed, thereby allowing them to also serve also as automatic alignment locks once the spectrometer has been aligned.

The combined benefits described above enable the spectrometer assembly to be successfully incorporated into the Dewar and dynamically aligned under the cryogenic operating conditions without the burden of a time consuming iterative alignment procedure, thereby reducing the unwanted stray light and thermal radiation in the system and enhancing the overall performance of the spectrometer.

The fabrication of large linear dynamic range piezo actuators has reached an unprecedented level of maturity. Piezo materials change dimensions when supplied with a voltage. The length of change is very small but can be done accurately and very fast. Applications that require large motions have been unable to utilize these piezo devices due to the limited range (<0.005"). Worm drives using two different pitched screws have been used to increase the piezo dynamic range by an order of magnitude. Picomtors™[4] by New Focus have greatly increased the linear range (~2") with limited resolution (500 nm). New Scale Technologies have developed Squiggle Motors™[2] have developed piezo motors with an unprecedented small size with large ranges and small resolutions. These motors find new applications optical alignment, such as, but not limited to, the following:

Lens—mirror centration
Auto-focus, image stabilization, factory alignment fixtures etc. . . .
Lens—mirror rotation
Auto-focus, image stabilization, factory alignment fixtures etc. . . .
Detector centration and rotation
Auto-focus, image stabilization, factory alignment fixtures etc. . . . Optical prism and wedge rotations and centrations
Auto-focus, image stabilization, factory alignment fixtures etc. . . . Minatures gimbals
Optical sensor motions such as one or two axis gimbals used for:
Scanned optical systems (bar code scanners, $2^{nd}$ Generation FLIR systems, F-Theta Scan systems used in print industry)
Commercial sensors, CCTV, Missile applications, Military and Civilian FLIRs.
Unmanned air vehicles and Micro-unmanned air vehicles.
Fitting gimbaled optical systems into a 15 mm×5 mm is very challenging. Without actuator advancements this type of sensing is nearly impossible.

In addition these motors are robust in difficult environments, such as cryogenic applications (discussed in detail below) and high G applications. A ball-joint gimbal with a compressed air interface has been developed for use on high G projectile applications. Squiggle motors can be used for these high G actuators.

Figure 2:
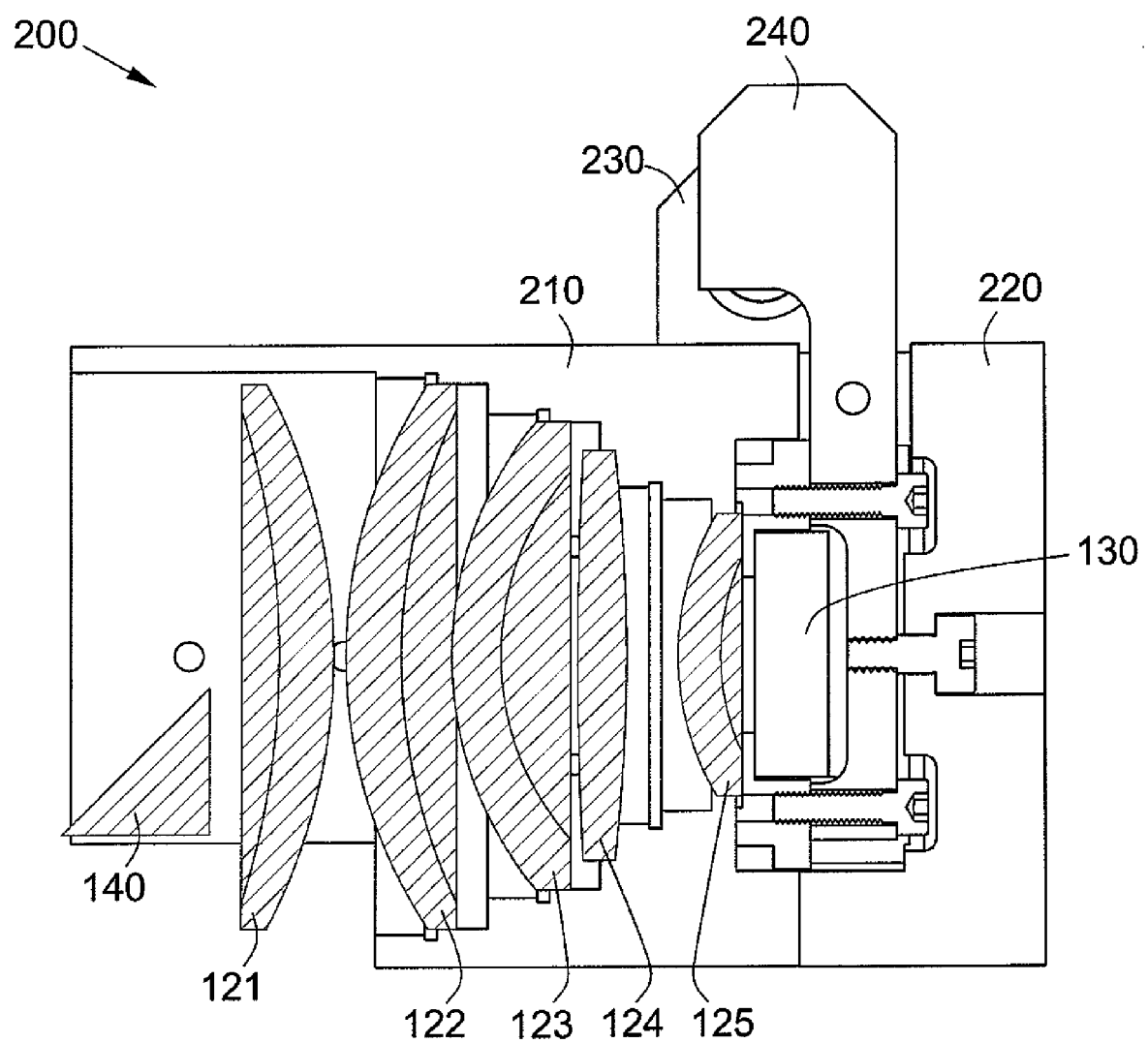
FIG. 2. Opto-Mechanical Housing with Spectrometer Overlay
Figure 6:
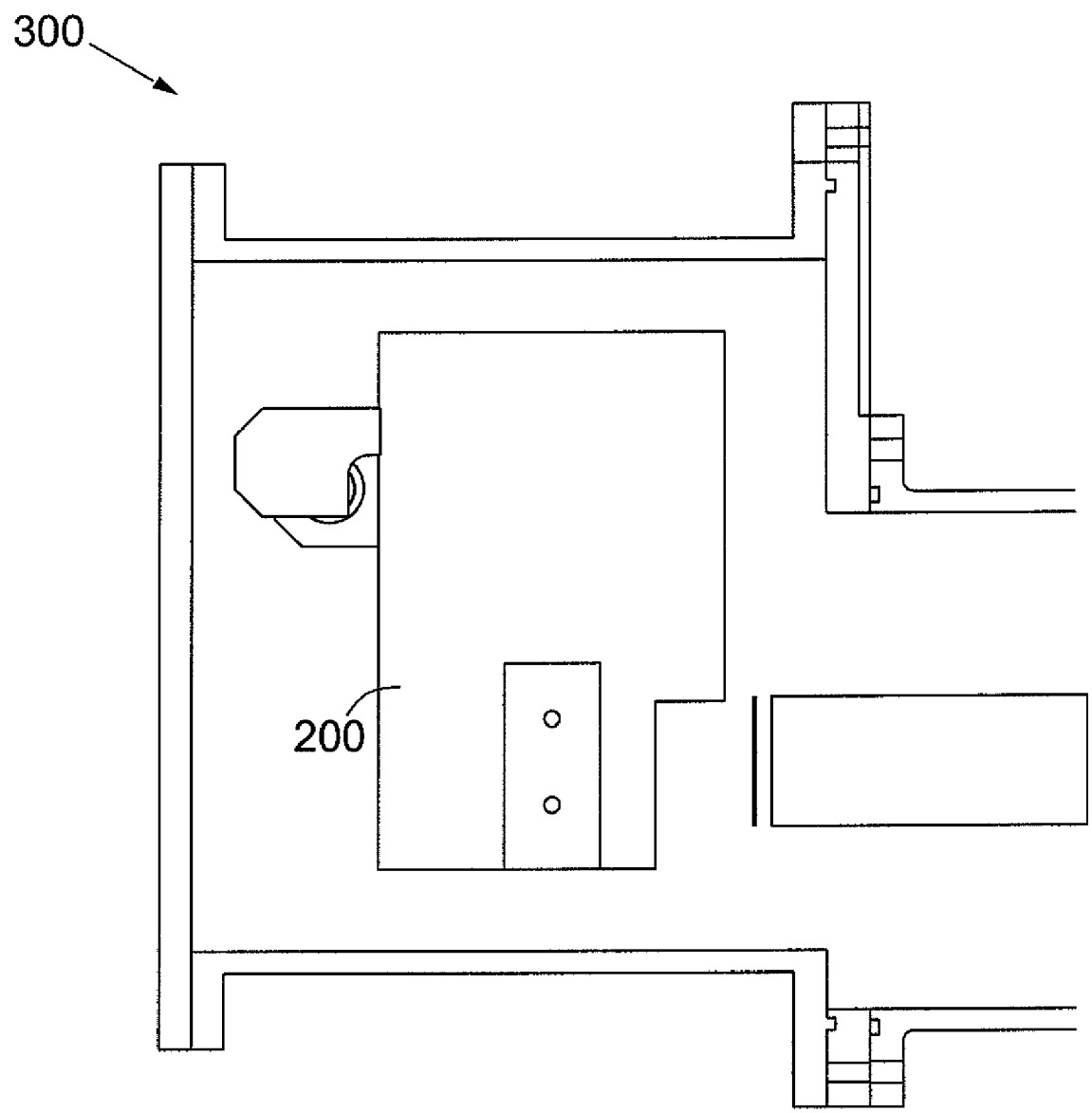
FIG. 6. Fabricated Opto-Mechanical Housing.

In order to experimentally demonstrate the cryogenic alignment of an optical system, an opto-mechanical housing was designed to be as compatible as possible with the spectrometer design 100 illustrated in FIG. 6. This spectrometer design is shown overlaid on a cutaway view of the opto-mechanical housing 200 in FIG. 2, with the individual optical elements 121, 122, 123, 124, 125, 140 shown and the grating 130, which is directly coupled to the actuator arm assembly 240.

Figure 3:
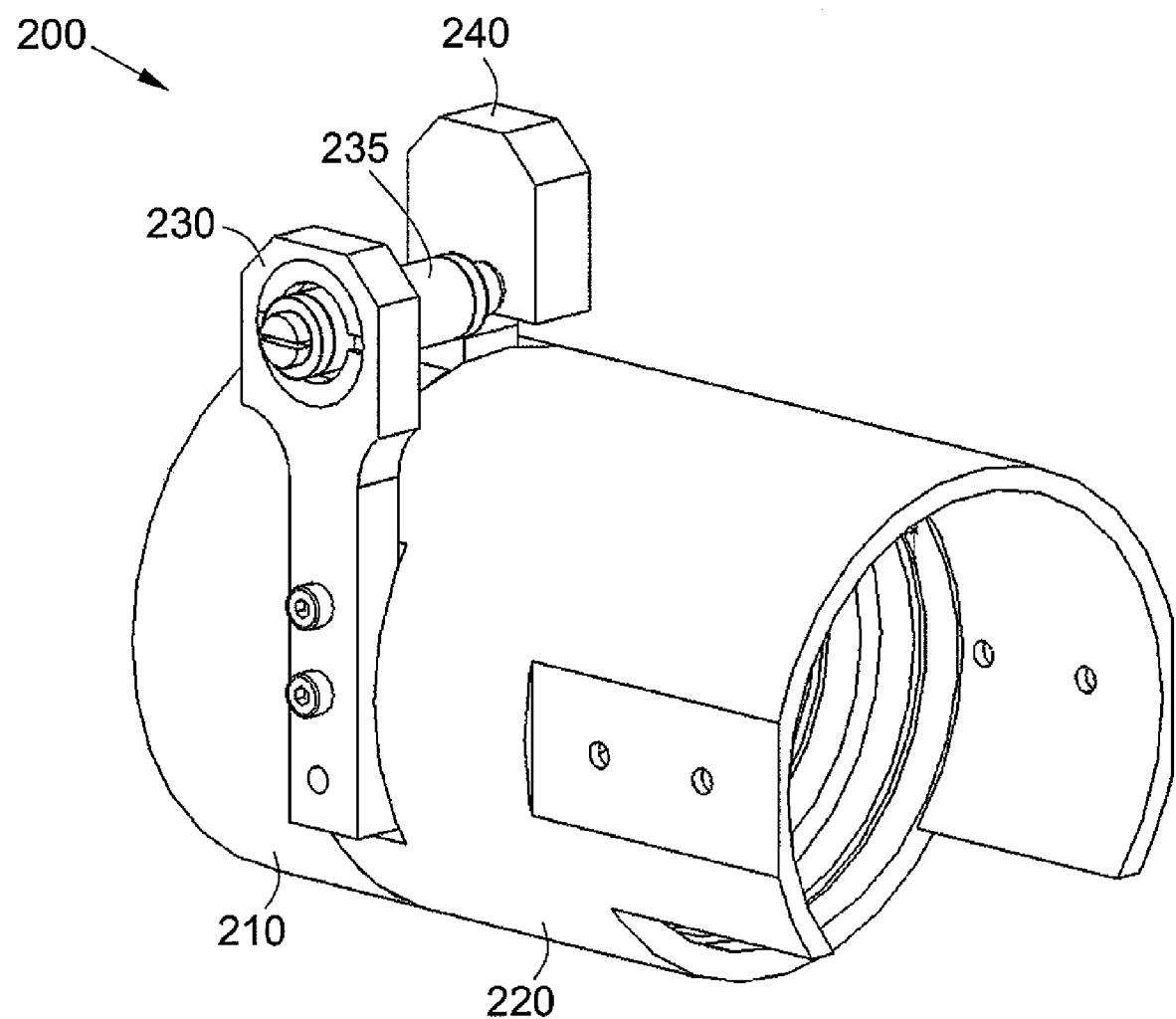
FIG. 3. Isometric View of the Opto-Mechanical Housing.
Figure 4:
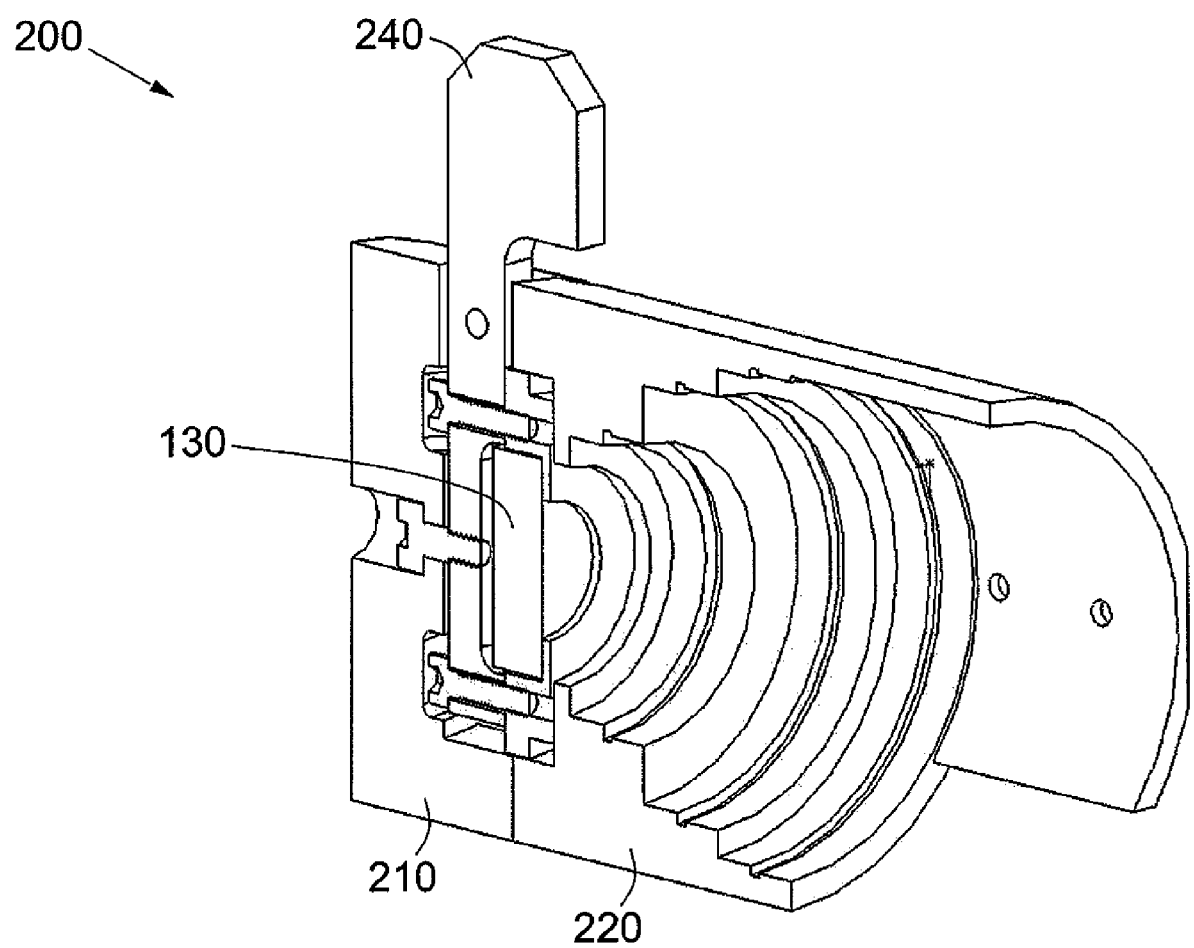
FIG. 4. Cutaway View of the Opto-Mechanical Housing.

In operation, the motor support arm 230 shown mounted to the main housing 210 in FIG. 3 supports the cryogenic motor 235 that drives the actuator arm component 240 illustrated in the sectional views of FIG. 4. As the motor 235 is driven, it provides linear translational motion, displacing the top of the actuator arm 240 and pivoting it about the optical axis of the system. This in turn rotates the grating 130 about the optical axis of the system, as shown in the cutaway view of FIG. 4. Given the relatively small range of angular displacement necessary for alignment of the grating 130 to the optical system, the incremental angular step size of the grating 130 can be related to the translational resolution of the cryogenic motor by the simple trigonometric approximation $$\Delta\theta = \frac{R}{\Delta X} \quad \text{Equation 1}$$

where $\Delta\theta$ is the incremental angular step size of the grating 130, ×X is the incremental linear step size of the motor 235 and R is the radial distance measured from the optical axis to the point of contact between the motor 235 and the actuator arm 240.

Figure 5A:
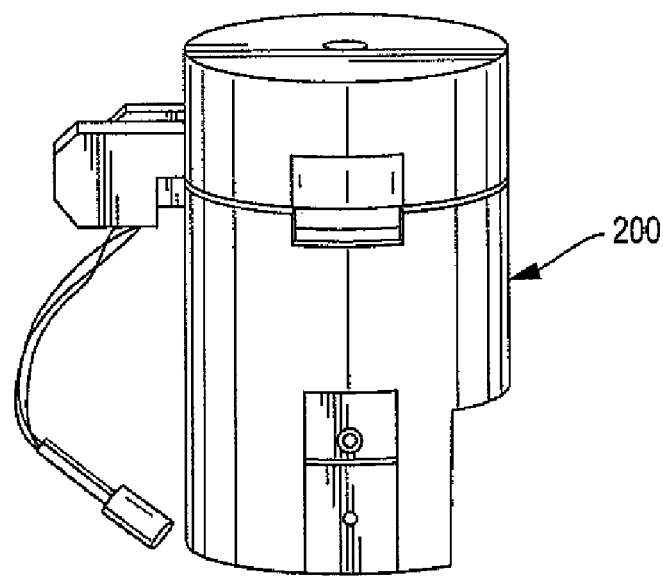
FIG. 5. Fabricated Opto-Mechanical Housing.
Figure 5B:
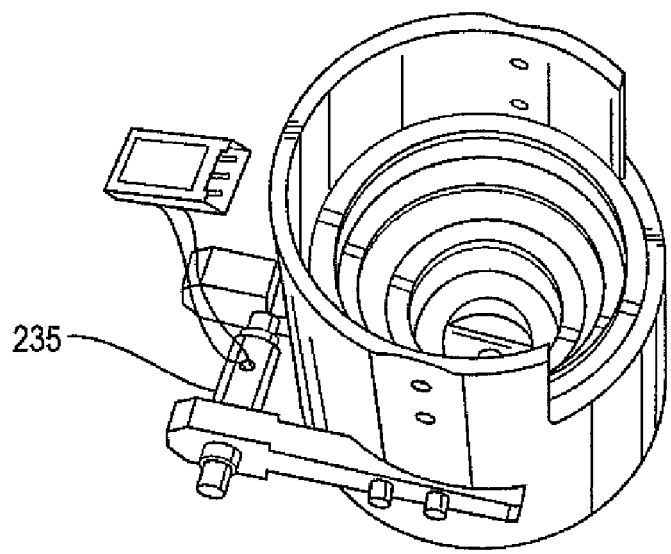

In order to maintain a very low system mass, the opto-mechanical housing components 210, 220, 230, 240 were fabricated from Aluminum, and polished to minimize the absorption of unwanted thermal radiation entering the Dewar through the view ports. To reduce any frictional drag that might limit the angular incremental step size of the actuator driven mirror, the entire grating mount and internal portion of the actuator arm 240 were first anodized and then impregnated with Teflon. Schematic drawings of a fabricated opto-mechanical housing 200 equipped with a cryogenic Squiggle™ motor 235 are shown in FIG. 5*a,b*.

FIG. 6 is a schematic sectional view of the cryogenic alignment system 200 enclosed within a Dewar environment 300, and illustrates the location and orientation of the opto-mechanical assembly 200. The Dewar can be a cryo-pump, pour filled $LN_2$, or any other type of Dewar that provides the cryogenic environment.

In order to provide dynamic alignment of an optical system 200 within a Dewar environment 300, an actuator device suitable for use in a vacuum and at cryogenic temperatures must be selected. This places several requirements on the actuator, its components, and its method of translation, including the exclusion of any lubricants or out-gassing materials and the proper matching of thermal coefficients of expansion between components.

Figure 7:
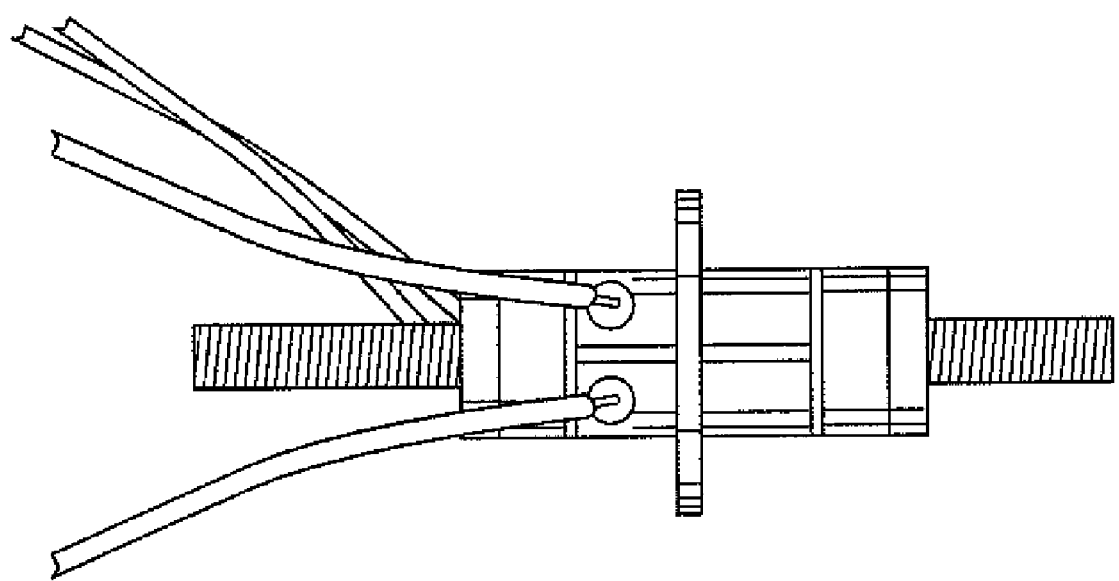
FIG. 7. New Scale Technologies' Miniature Squiggle™ Motor Core.

One type of cryogenic actuator that overcomes these limitations has recently been developed by New Scale Technologies. Their miniature Squiggle™ motor, shown in FIG. 7, consists of a piezoelectric ceramic tube that supports two threaded nuts holding a threaded shaft. Electrically driven at an ultrasonic frequency, the piezoelectric tube wobbles like a "Hula Hoop", causing the nuts to orbit the shaft, thereby rotating and translating the shaft in the axial direction.

Figure 8:
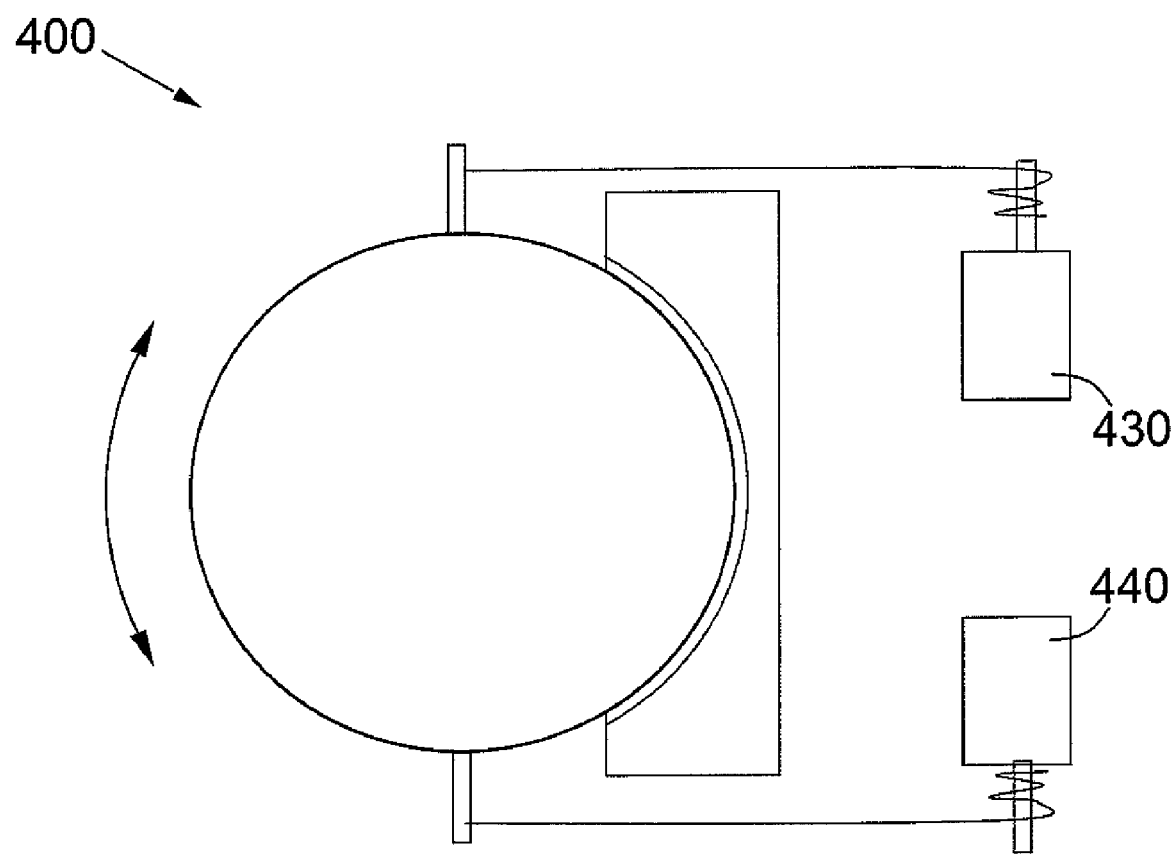
FIG. 8. Squiggle motor used on the high-G ball joint gimbal.

FIG. 8 shows the application of the Squiggle™ Motor on a compressed air interface Ball-Joint gimbal 400. Referring to FIG. 8, two Squiggle™ Motors 430, 440 (or equivalent) are used in pull/push configuration.

Figure 9:
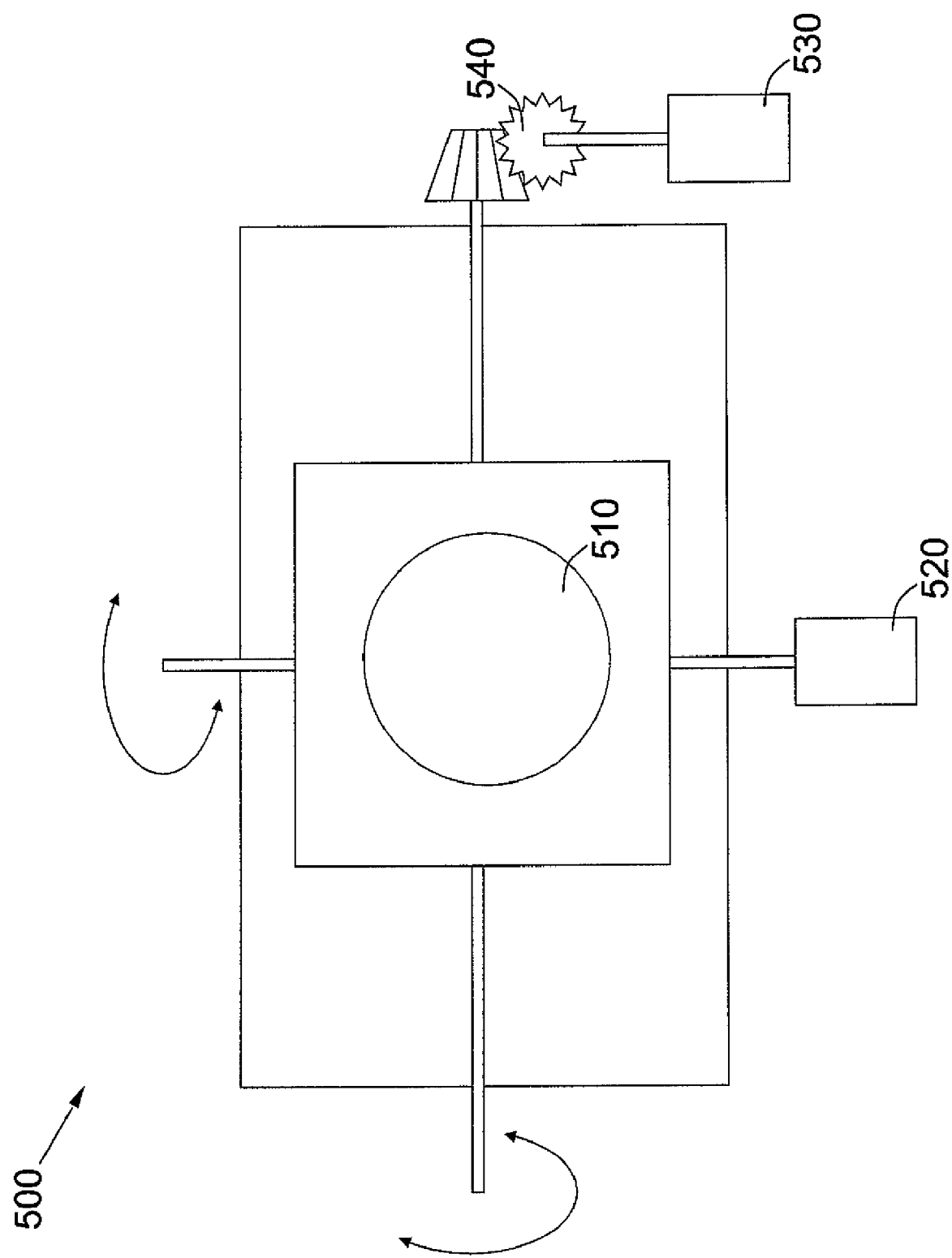
FIG. 9. Conventional Gimbal Application

FIG. 9 shows the application of Squiggle™ Motor in Conventional Gimbal systems 500. Two Squiggle™ motors 520, 530 (or equivalent) are used in a conventional gimbal 510, one Squiggle™ Motor 520 in a direct drive configuration used for angular degree of freedom, another Squiggle™ Motor 530 in a gear drive configuration 540 used for the other angular degree of freedom.

Although the invention has been described with respect to various embodiments, it should be realized this invention is also capable of a wide variety of further and other embodiments within the spirit and scope of the appended claims.

What is claimed is:

1. A spectrometer comprising:
   at least one slit element located at an object plane;
   a first optical sub-system having at least one refractive optical element;
   said first optical sub-system being capable of substantially collimating, at a center plane, electromagnetic radiation emanating from said at least one slit element;
   at least one dispersive element located substantially at the center plane;
   a second optical sub-system having at least one refractive optical element;
   said second optical sub-system and said first optical sub-system being designed substantially according to a symmetrical principle, the center plane being the plane of symmetry;
   said second optical sub-system being capable of imaging the substantially collimated electromagnetic radiation from the center plane onto an image plane;
   at least one detecting element located substantially at the image plane;
   wherein said at least one dispersive element comprises a reflective dispersive element; and,
   said first optical sub-system is also the second optical sub-system, acting as a dual pass optical sub-system;
   a housing;
      at least one optical component from said first optical sub-system being positioned within said housing;
      said housing defining an interior longitudinal axis;
      an optical axis of said first optical sub-system being substantially coincident with said interior longitudinal axis; and,
      a structure within said housing, said structure being adapted to hold said reflective dispersive element; said structure being movable in a direction substantially perpendicular to said interior longitudinal axis;
   an actuator arm extending from a location exterior to said housing to another location inside said housing; said actuator arm being disposed through an opening in said housing and been operatively connected to said structure; and
   a cryogenic actuator motor operatively connected to said actuator arm;
   said cryogenic actuator motor enabling movement of said structure and said reflective dispersive element in a direction substantially perpendicular to said interior longitudinal axis;
   whereby alignment of the spectrometer is enabled.

* * * * *